United States Patent [19]
Veloce

[11] Patent Number: 5,611,297
[45] Date of Patent: Mar. 18, 1997

[54] POMPON FOR CAT TOY

[76] Inventor: Frank M. Veloce, 5987 Ochonski Rd., Orono, Ontario, Canada, L0B 1M0

[21] Appl. No.: 342,589

[22] Filed: Nov. 21, 1994

[51] Int. Cl.⁶ .................................................. A01K 29/00
[52] U.S. Cl. ............................................................ 119/708
[58] Field of Search ............................. 119/707, 708, 119/709, 710, 711; 28/147; 428/4; 273/58 E, 58 J, 58 R; 446/397, 409

[56] References Cited

U.S. PATENT DOCUMENTS

| | | | |
|---|---|---|---|
| 2,003,958 | 6/1935 | Salisbury | 119/709 |
| 2,509,087 | 5/1950 | Edmund | 273/58 R |
| 2,810,977 | 10/1957 | Barry | 428/156 |
| 4,770,123 | 9/1988 | Bell | 119/709 |
| 4,962,926 | 10/1990 | Chen | 273/58 J X |
| 5,322,036 | 6/1994 | Merino | 119/707 |
| 5,477,815 | 12/1995 | O'Rourke | 119/710 |

*Primary Examiner*—Robert P. Swiatek
*Assistant Examiner*—Elizabeth Shaw

[57] ABSTRACT

The pompon includes a mass of soft fibrous material. A number of pieces of flexible material is interspersed through the mass. The flexible material crinkles or rustles when it is touched by a cat and may be aluminum foil, acetate paper, polyethylene or polypropylene. The fibrous material may be wool or acrylic.

6 Claims, 2 Drawing Sheets

POMPON FOR CAT TOY

BACKGROUND OF THE INVENTION

This invention relates to toys for cats and more particularly to a pompon or ball of soft material which rustles or crinkles when it is touched.

Most kittens love to play with small soft balls. They will bat it if it is attached to a string and will pounce on it if it is thrown. Balls for this purpose are conventionally composed of soft material such as sponge rubber or wool so that the kitten can bite into it without injury.

It is known to incorporate some device that will make a noise into a ball for kittens. A noise-making device is thought to make the ball more appealing to a kitten. Balls are known, for example, which are composed of a hollow sphere of soft rubber having a bell in its interior. Such balls however have a number of short comings one of which being that they tend to be somewhat heavy. If they are free to swing on a string they can strike a kitten rather hard thereby discouraging the kitten from continuing to play with it. In addition the noise made by the bell is often too loud and frightening to a kitten.

SUMMARY OF THE INVENTION

It is an object of this invention to provide a toy for a cat which is light of weight, is soft and makes a quiet crinkling or rustling sound when batted or bitten by a cat.

Another object of the invention is to provide a toy which can be made very cheaply and quickly.

These and other objects are accomplished by a toy comprising: a mass of soft material; and a piece of flexible material which is within the mass and which crinkles or rustles when touched.

DESCRIPTION OF THE DRAWINGS

The invention is described in detail with reference to the accompanying drawings in which.

Like reference characters refer to like parts throughout the description of the drawings.

DESCRIPTION OF THE PREFERRED EMBODIMENT

Figure 1:
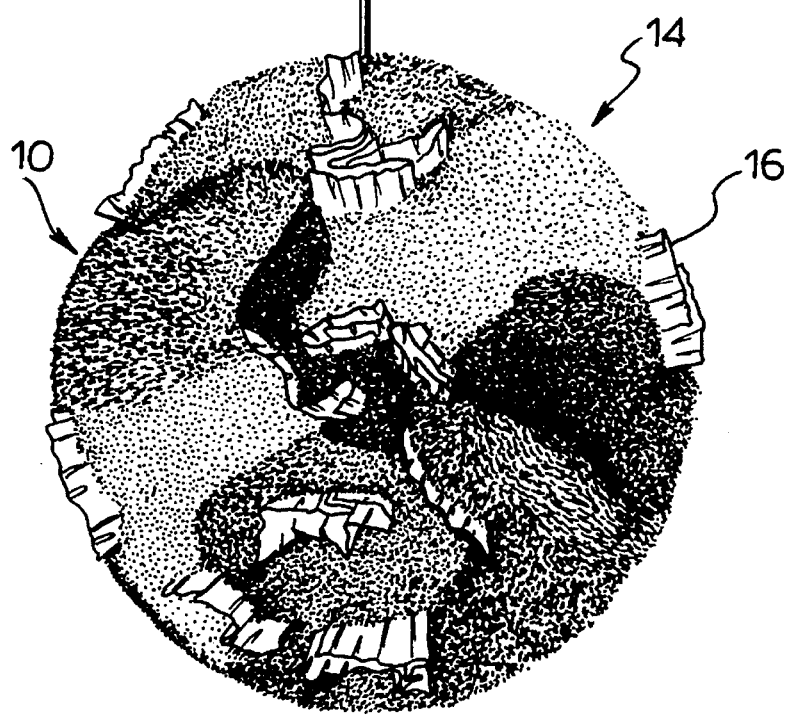
FIG. 1 is a perspective view of the toy of the invention.

With reference to FIG. 1, the toy of the invention, indicated generally 10, is in the form of a ball or pompon attached to a string 12. The toy is made up of a mass generally 14 of soft fibrous material within which sheets 16 of flexible material are interposed.

Figure 2:
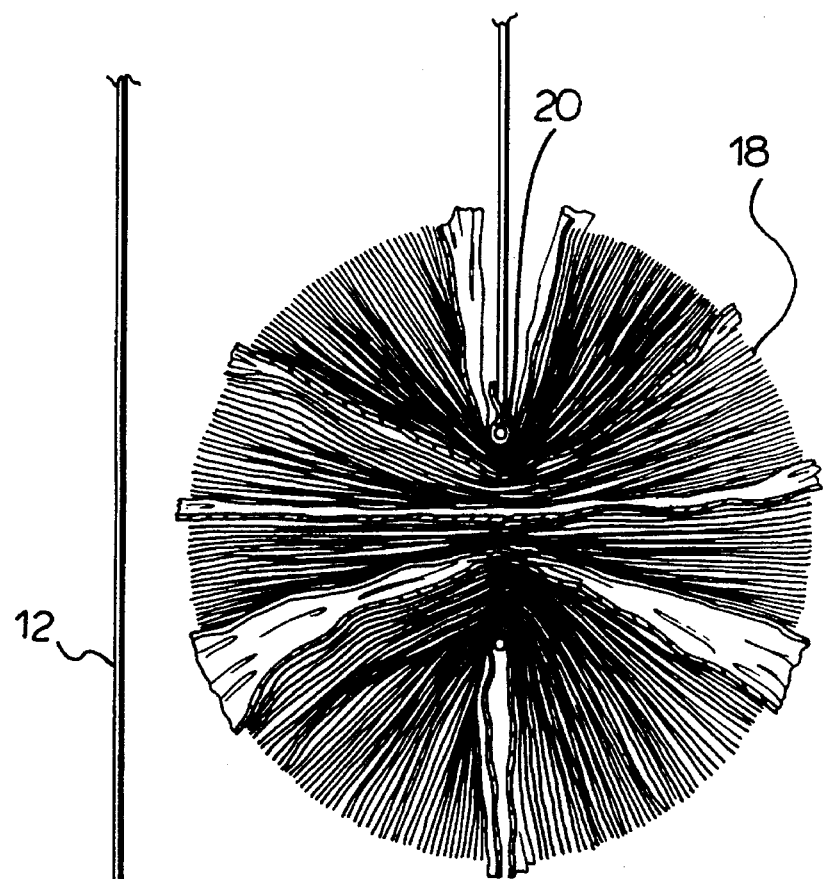
FIG. 2 is a section of the toy.

With reference to FIG. 2, the fibres 18 which make up the mass of soft material are bound together by means of a piece of string 20. The ends of the string are tied together to prevent the fibres from separating from one another. The string is tied to string 12. Between those fibres are the sheets 16 of flexible material.

Figure 3:
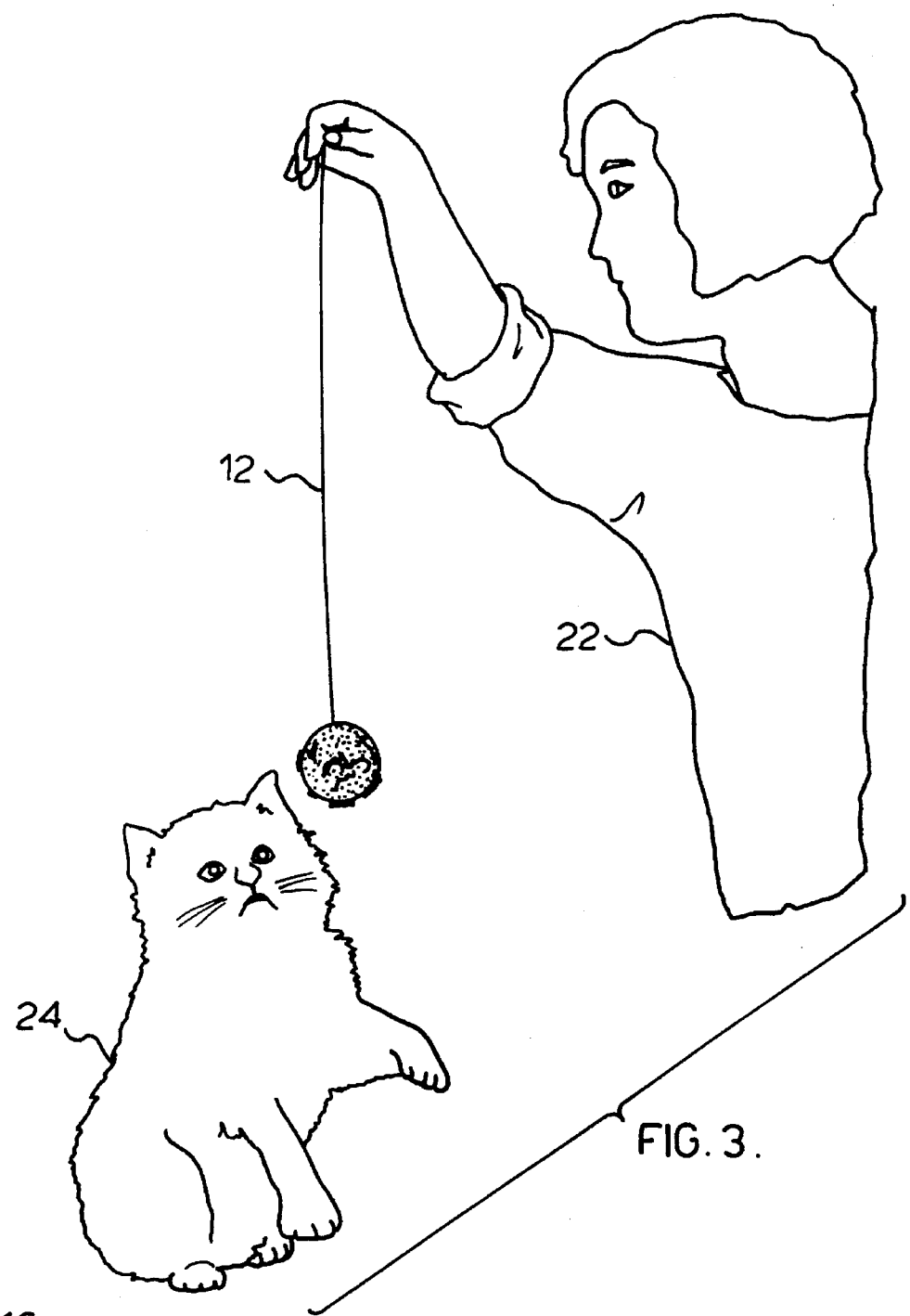
FIG. 3 is another perspective view of the toy in smaller scale 1 showing the manner in which it is used.

With reference to FIG. 3, a girl 22 holds the toy by string 12 and the pompon is being batted by a cat 24. When the cat's paw strikes the pompon the flexible material will crinkle or rustle and will, as a result, hold the attention of the cat. Should the cat bite into the pompon it will not be injured because of the softness of the fibrous mass and because of the flexibility of the sheet material. That material when bitten will fold around the cat's teeth or be penetrated by them without injury to the animal.

Figure 4:
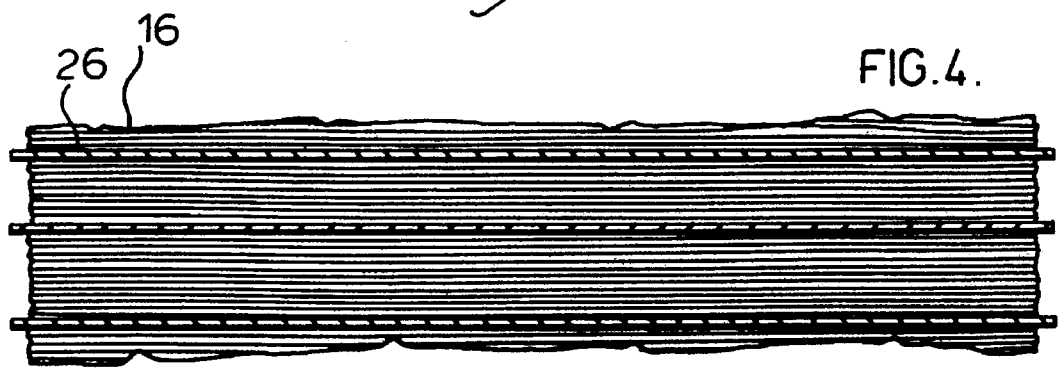
FIG. 4 is a plan view of a component of the toy shown flattened.

With reference to FIG. 4 the flexible material is shown flattened and several strands 26 of the soft material rest on it. The flexible material must crinkle or rustle when touched but must not make a loud noise that will alarm a cat. Material suitable for this purpose may be aluminum foil, acetate paper, polyethylene or polypropylene of thickness of about 1 to 3 millimeters. The soft material surrounding the sheets of flexible material may be wool or soft acrylic.

It will be understood of course that modifications can be made in the preferred embodiments illustrated and described herein without departing from the scope and purview of the invention as defined in the appended claims.

The embodiments of the invention in which an exclusive property or privilege is claimed are defined as follows:

1. A toy comprising a mass of soft fibrous material and a plurality of sheets of flexible material interspersed within and through said mass and which crinkles or rustles when touched.

2. The toy as claimed in claims 1 wherein said flexible material is selected from the group consisting of aluminum foil, acetate paper, polyethylene and polypropylene.

3. The toy as claimed in claims 1, wherein said soft material is selected from the group comprising wool and acrylic.

4. A ball comprising a mass of soft fibrous material; and a plurality of sheets of flexible material which is interspersed through said mass and which crinkles or rustles when touched.

5. A ball as claimed in claim 4 wherein said flexible material is selected from the group consisting of aluminum foil, acetate paper, polyethylene and polypropylene.

6. A ball as claimed in claim 4 wherein said soft material is selected from the group comprising wool and acrylic.

* * * * *